June 17, 1958 D. W. BIKLEN 2,839,088
BITUMINIZED FIBER PIPE
Filed June 1, 1955
FIG. 1
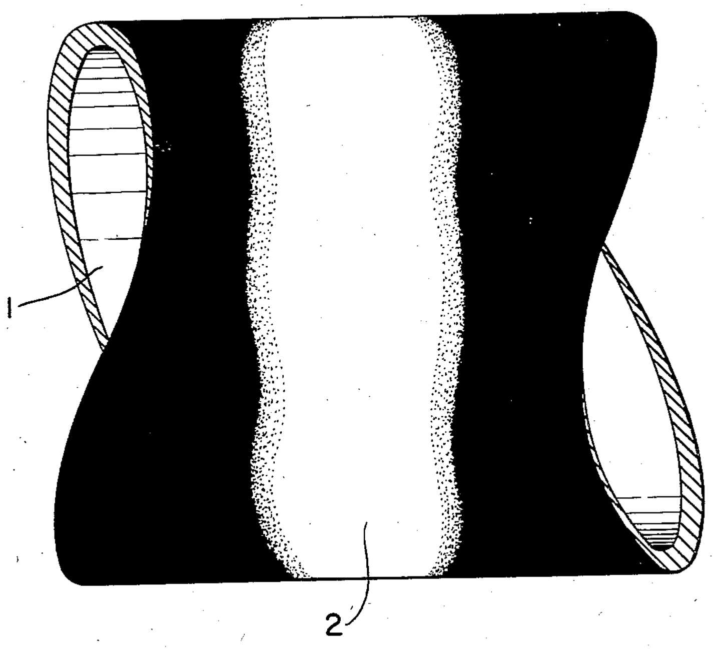
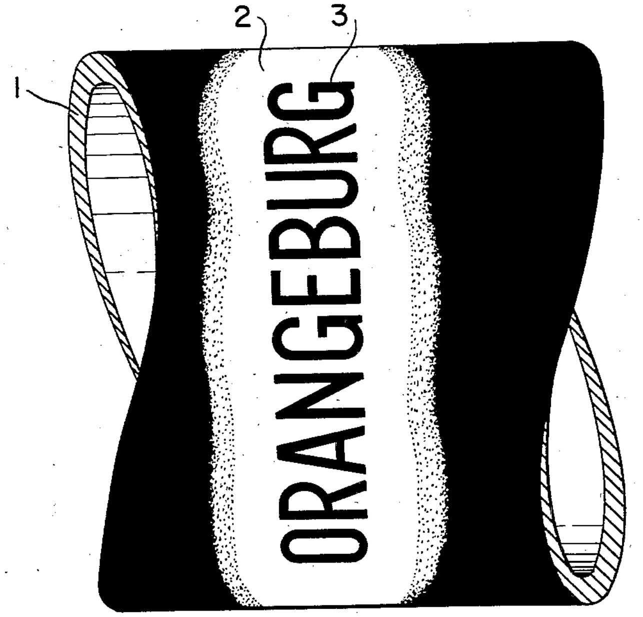
FIG. 2
INVENTOR
Donald W. Biklen
BY
Pennie, Edmonds, Morton, Barrows & Taylor
ATTORNEYS United States Patent Office 2,839,088
Patented June 17, 1958

1

2,839,088

BITUMINIZED FIBER PIPE

Donald W. Biklen, Park Ridge, N. J., assignor to Orangeburg Manufacturing Co., Inc., Orangeburg, N. Y., a corporation of New York Application June 1, 1955, Serial No. 512,515

2 Claims. (Cl. 138—47)

This invention relates to the marking of bituminized fiber pipe or conduit for subsequent identification. More particularly, the invention is concerned with the application of a permanent marking or markings to such a pipe or conduit for substantially permanent identification thereof without the heretofore necessary preconditioning of the surface of the pipe to be marked.

Bituminized fiber pipe or conduits are a well known product employed primarily for conducting liquids and drainage and for carrying electrical cables and the like where resistance to corrosion, erosion and disintegration is required. The pipe is broadly composed of a bituminous compound reinforced with an interwoven fibrous structure. Its nature and characteristics are fully disclosed in the pamphlet entitled "Commercial Standard CS116-54" issued by the United States Department of Commerce and having an effective date of September 10, 1954.

It has heretofore been difficult permanently to mark bituminized fiber pipe or conduit with conventional marking materials such as ink, paint, lacquer, etc. for subsequent identification without first expensively preconditioning the surface of the pipe to free it from moisture, dirt, dust, etc., which would interfere with the application of the marking material and result in a poor bonding thereof to the pipe surface. In addition, the pitch in the pipe chemically attacks and bleeds into the marking material either immediately after its application to the pipe surface or upon aging. Hence the marking, at least in time, became unidentifiable.

Attempts have been made to overcome the above-set-forth difficulties in marking with conventional marking material by attempting to hot brand the pipe surface with some identifying marking. For this purpose, however, the pipe surface again has to be clean in order to avoid gumming up of the marking mechanism. Furthermore, the pitch in the pipe also tends to gum up the marking mechanism such as a hot brand. Also, of course, the brand itself or the pipe must be heated and must be uniformly so heated. Hence if the pipe were cold from outside storage, for example, branding temperatures that might normally be satisfactory for branding freshly made pipe would have to be modified to accommodate this difference in temperature condition of the surface to be marked.

Other methods of marking have been attempted which require the application of substantial pressure to the pipe. In order to avoid crushing or fracturing, the pipe wall to be subjected to such pressure need necessarily have been backed up, which required of course a substantial uniformity in wall thickness. Hence, crushing and fracturing occurred where wall thickness varied within otherwise satisfactory limits or the surface was not effectively marked.

It is the principal object of my invention to provide a system for readily and permanently marking bituminized fiber pipe which does not depend in any way upon the general surface condition of the pipe insofar as general cleanliness and temperature condition thereof is concerned, and further does not depend upon exact wall thickness tolerances.

2

Broadly my invention involves the application to a portion of the surface of a bituminized fiber pipe of a metal coating that will tightly adhere thereto despite the general condition of the surface when the coating is applied and despite the thickness of the wall beneath such coated portion of the pipe surface. While this metal coating may in and of itself comprise the identifying marking of the pipe, I contemplate that it may be advantageous to add a further marking of a conventional marking material to such coating. Such subsequent marking with a conventional marking material is not subject to the deteriorating factors mentioned above, namely, insecure bonding by reason of dirt, dust or the like or chemical attack from the material of the pipe itself. While such additional marking of the conventional marking material is subject to attack in the same manner from conditions exteriorly surrounding the pipe when in use that it was previously, because of its better condition it tends to be considerably more permanent in this respect than it was when applied directly to the surface of a pipe. In this connection, however, it will be noted that the metal coating by reason of its metallic nature will be better able to withstand any attack by reason of the surrounding conditions than markings of prior conventional marking materials.

More specifically, my invention involves my discovery that the surface of a bituminized fiber pipe or conduit may be effectively marked by spraying thereon in molten condition a metal powder without any preconditioning whatever of the surface of the pipe following manufacture thereof. Hence I have found that regardless of whether the pipe is cold, dusty, wet, has a rough surface or a varying wall thickness, molten metal powder in spray form will adhere thereto. The metal will remain adhered to the surface, not suffering from chemical attack by any of the components of the pipe itself and suffering to a minimum as a result of exterior environment. Furthermore, when cooled, which takes no substantial length of time whatever, a metal coating provides a clean, dry surface which lends itself to a further marking with a conventional marking material such as ink, paint, lacquer or the like.

In the accompanying drawings I have illustrated in Fig. 1 a length of bituminous fiber pipe to which has been applied a metal coating in the form of a band.

In Fig. 2 there is illustrated the same length of pipe with the same metal coating with the additional feature that a marking comprising a name has been applied thereto with conventional marking material.

Referring to Fig. 1, reference numeral 1 identifies a length of bituminized fiber pipe, black in color. A band of metal 2 about 1 mil thickness and made of zinc is adhered to the surface of the pipe. The zinc has been applied from a conventional spray apparatus or gun which receives the zinc in powdered form, heats it to molten states and ejects it onto the pipe in the form of a molten spray. The temperature to which the zinc powder is heated in the spray gun is about 1400° F.

Such a zinc band, which is light gray in color, may itself form the identifying marking. As such it is securely adhered to the surface of the pipe, is non-attackable by the components of the pipe and does, as well as would any other material with which we are familiar and certainly better than conventional marking materials which have heretofore been employed, withstand the deteriorating effect of any exterior environment in which the pipe is used. If, however, some distinguishing marking is desired that is more distinctive than the plain metal band, for example, a manufacturer's name, it can now be readily applied without difficulty with conventional marking materials because it may be applied to the clean, dry and relatively smooth surface of the metal band. Hence a marking such as that indicated by the reference numeral 3 in Fig. 2 may be applied to the metal band 2 with a conventional marking material such as paint. In addition to the fact that such a marking 3 of a conventional marking material may be clearly and readily applied by reason of the clean, dry surface of the metal band, such a marking will also be free from attack by the pitch in the pipe because of the fact that it is separated therefrom by the metal band that is not itself subject to such attack and therefore acts as a barrier.

While for the purposes of the above illustration powdered zinc has been the metal specifically mentioned, I contemplate that other metals such as powdered aluminum, steel, copper, brass, solder and bronze which are available and which may be similarly applied, may be employed in carrying out my invention. Furthermore, other conventional marking materials such as ink, lacquer or the like might be employed for the marking 3.

As indicated, any metal spray apparatus or gun may be employed in carrying out my invention. For example, such an apparatus that may be satisfactorily employed is one that has generally been known as a Schoop apparatus. One such apparatus is disclosed in Schoop Patent 1,100,602.

It will be clear that various changes and modifications may be made in the above-described marking without departing from the scope of my invention which should be limited rather only to the extent set forth in the appended claims. For example, while I have disclosed specifically the application of a metal coating in the form of a band surrounding a portion of a piece of pipe, it will be clear that stripes, spirals, etc. might be formed thereon instead.

I claim:

1. A bituminized fiber pipe having a coating on a portion of the surface thereof of a metal, and a marking of a material selected from the class consisting of inks, paints and lacquers on the metal coating of a color contrasting to the color of the metal, the metal coating forming a barrier between the bituminized fiber pipe and the marking preventing the bitumen of the pipe from chemically attacking the marking, whereby the marking is protected against chemical attack and bleeding into by the bitumen of the pipe.

2. A bituminized fiber pipe as set forth in claim 1 in which the metal of the coating is one selected from the group consisting of zinc, aluminum, steel, bronze, copper, brass and solder.

References Cited in the file of this patent

UNITED STATES PATENTS

| | | |
|---|---|---|
| 1,396,021 | Burningham et al. | Nov. 8, 1921 |
| 1,488,186 | Young | Mar. 25, 1924 |
| 2,076,212 | Suter et al. | Apr. 6, 1937 |
| 2,143,948 | Karl | Jan. 17, 1939 |